& Sawall

United States Patent [19]

Weyenberg

[11] Patent Number: 4,636,001
[45] Date of Patent: Jan. 13, 1987

[54] TILTABLE SEAT FOR VEHICLE
[75] Inventor: Lionel E. Weyenberg, Waupaca, Wis.
[73] Assignee: Level-Rider Inc., Waupaca, Wis.
[21] Appl. No.: 788,476
[22] Filed: Oct. 17, 1985
[51] Int. Cl.$^4$ .............................. A47C 1/00; B60N 1/02
[52] U.S. Cl. .......................................... 297/314; 248/371
[58] Field of Search ............................ 297/314; 248/371
[56] References Cited
U.S. PATENT DOCUMENTS

| 2,167,912 | 8/1939 | Schwinn | 248/371 X |
|---|---|---|---|
| 2,284,352 | 5/1942 | Zank | 155/121 |
| 2,770,286 | 11/1956 | Weller | 155/5 |
| 3,021,107 | 2/1962 | Salo | 297/314 X |
| 3,315,934 | 4/1967 | Taylor | 248/376 |
| 3,341,165 | 9/1967 | Taylor | 297/314 X |
| 3,533,658 | 10/1970 | Gropp | 297/355 |
| 3,632,076 | 1/1972 | Rogers, Jr. | 248/371 |
| 3,670,834 | 6/1972 | Rogers | 297/314 X |
| 3,741,511 | 6/1973 | Streeter | 248/371 |
| 4,095,770 | 6/1978 | Long | 297/314 |

Primary Examiner—Francis K. Zugel
Attorney, Agent, or Firm—Andrus, Sceales, Starke & Sawall

[57] ABSTRACT

A tiltable seat for a vehicle, such as a tractor. The seat is pivoted to a support about a pivot axis that extends in a fore and aft direction with respect to the vehicle and is located midway between the sides of the seat. A linkage connects the seat support with a fluid cylinder that is secured to the frame of the vehicle. A piston is slidable within the cylinder, and a pair of piston rods are connected to the piston and extend from opposite ends of the cylinder. One of the piston rods is pivotally connected to the seat. Connecting opposite ends of the cylinder is a conduit, and a manually adjustable valve is connected in the conduit. The weight of the operator on the seat will cause the seat to tilt when the vehicle is moving across a slope to thereby move the piston relative to the cylinder. Movement of the piston will cause fluid from one end of the cylinder to pass through the conduit to the opposite end of the cylinder and the flow of the fluid is regulated by the valve to control the tilting movement.

3 Claims, 4 Drawing Figures

TILTABLE SEAT FOR VEHICLE

BACKGROUND OF THE INVENTION

Tractors and other vehicles must occasionally operate over inclined surfaces, such as a highway right of way, golf course fairways, and the like. When a tractor operates or moves along an inclined slope, the tractor seat will be at an angle to the horizontal, while the operator attempts to maintain his body in an upright position. This results in the operator being in an awkward position which can cause physical discomfort and can cause an inherent safety hazard due to the imbalance of the operator with relation to the tractor.

Various devices have been proposed in the past to provide self-leveling characteristics for a tractor seat. Many of these devices have been rather complex, requiring a hydraulic or electrical power source or requiring a complicated guide mechanism for guiding the seat in tilting movement. For example, U.S. Pat. No. 3,632,076 discloses a self-leveling tractor seat in which the seat carries a plurality of rollers which move in a curved guide track on the vehicle frame. A fluid cylinder connects the seats and the support and acts to dampen the tilting movement of the seat.

SUMMARY OF THE INVENTION

The invention is directed to a simple and inexpensive tiltable seat for use with a tractor or other vehicle. In accordance with the invention, the seat is pivoted to a seat support about a pivot axis that extends in a fore and aft direction with respect to the vehicle and is located midway between the sides of the seat. A linkage connects the seat support with a cylinder that is secured to the vehicle frame and is offset laterally from the pivot axis. A piston is mounted for sliding movement within the cylinder and carries a pair of piston rods that extend through the respective ends of the cylinder. One of the piston rods is pivotally connected to the seat.

Connecting the opposite ends of the cylinder is a conduit, and a manually adjustable valve is located in the conduit to control the flow of fluid between opposite ends of the cylinder.

When the vehicle moves along an incline or slope, the weight of the operator will tilt the seat, causing the piston to move within the cylinder and resulting in fluid from one end of the cylidner passing through the conduit to the opposite end of the cylinder. The control valve regulates the flow of fluid through the conduit and thus controls the resistance to tilting movement of the seat.

The tilting mechanism of the invention is simple and inexpensive and can be readily installed on existing and new vehicle seats. The device does not require any modification of the basic seat structure and can be marketed in kit form for installation on both new and existing tractors.

The mechanism of the invention does not require any auxiliary electrical or hydraulic power source, nor does it require any guide mechanism for guiding the seat in tilting movement. The weight of the operator will cause the seat to tilt and the resistance to the tilting movement is regulated by the valve mechanism, so that the seat can be maintained at a given attitude without oscillating, even when the vehicle moves over uneven or rough terrain.

Through use of the tilting mechanism of the invention, the operator will be in a generally upright position when the tractor traverses a slope to resist overturn of the tractor, to improve the safety factor, and proviode a more comfortable physical position for the operator.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

The drawings illustrate a mechanism for providing tilting characteristics for a vehicle seat, such as a tractor seat, which enables the seat to maintain a generally horizontal attitude as the vehicle moves along a slope or incline.

Figure 1:
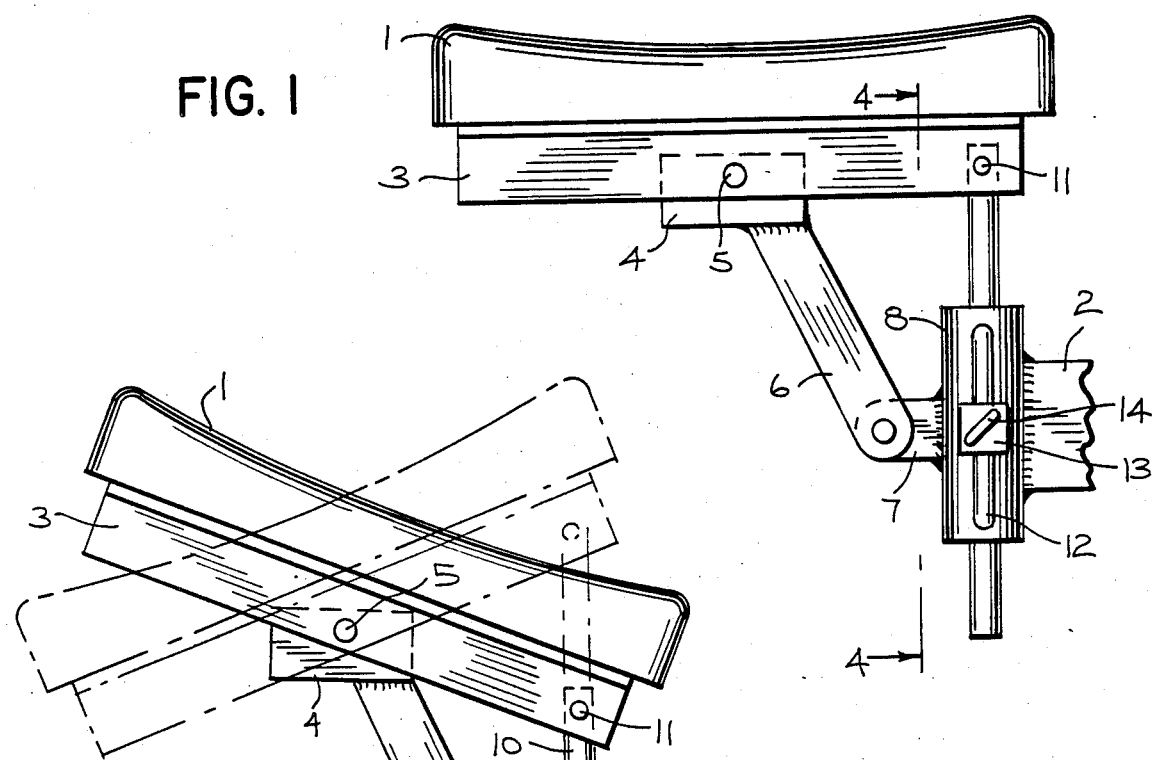
FIG. 1 is an elevational view of a vehicle seat incorporating the self-leveling mechanism of the invention.
Figure 2:
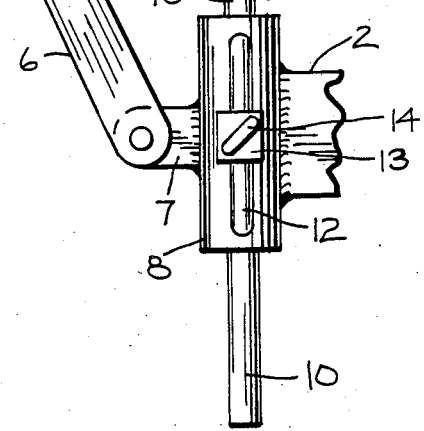
FIG. 2 is a view similar to FIG. 1, showing the seat in a tilted condition.
Figure 3:
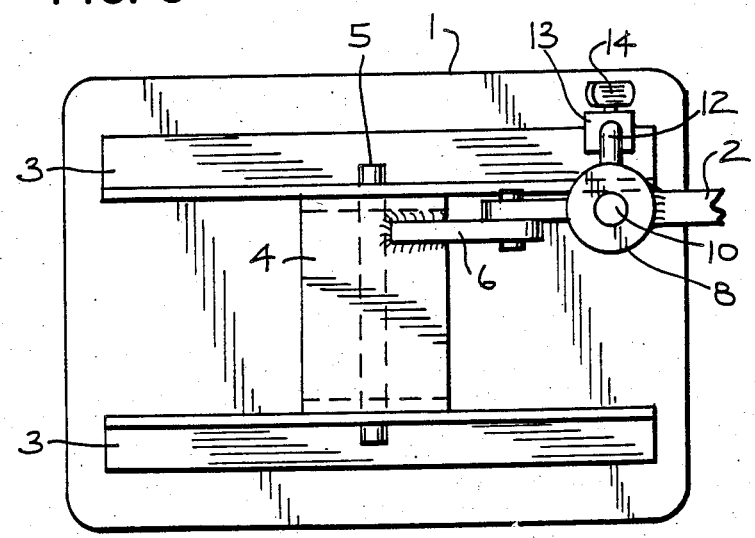
FIG. 3 is a bottom view of the construction shown in FIG. 1.
Figure 4:
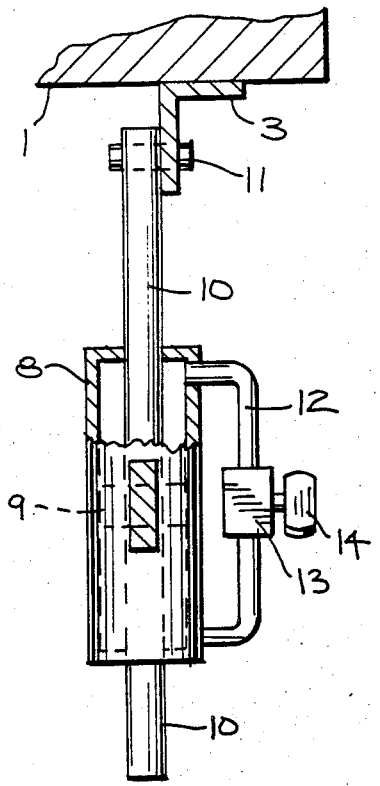
FIG. 4 is a section taken along line 3—3 of FIG. 1.

As illustrated in FIG. 1, the vehicle seat 1 is mounted for tilting movement with respect to the vehicle frame 2. To provide this tilting movement, a pair of angles 3 are mounted in spaced parallel relation on the underside of seat 1 and a channel 4 is pivotally connected to the angles 3 by a pivot shaft 5. Pivot shaft 5, as best shown in FIG. 2, extends in a fore and aft direction with respect to the movement of the vehicle and is located midway between the sides of seat 1.

Secured to channel 4 is an arm 6 and the lower end of the arm is pivotally connected to a lug 7 that is secured to the outer surface of a fluid cylinder 8. As shown in FIG. 2, cylinder 8 is offset from the pivot shaft 5 and is located adjacent a corner of the seat. A piston 9 is slidable in cylinder 8 and carries a pair of piston rods 10 which extend through opposite ends of cylinder 8. As best shown in FIG. 1, one of the piston rods 10 is pivotally connected to one of the angles 3 at pivot 11.

As cylinder 8 is closed, a recirculating conduit 12 connects the opposite ends of the cylinder, and a valve 13 is mounted in conduit 12 and carries an adjusting knob 14. Adjustment of valve 13 through knob 14 controls the flow of fluid through conduit 12 and thus regulates the resistance to tilting movement of seat 1.

When the vehicle moves along a slope or incline, the weight of the operator on one side of the seat 1 will act to tilt the seat about pivot axis 5 and the tilting action, acting through piston rod 10, will move piston 9 in cylinder 8 and cause hydraulic fluid in one end of the cylinder to be displaced through conduit 12 to the opposite end of the cylinder. The flow of fluid through the conduit 12 is regulated by adjustment of valve 13. By proper adjustment of valve 13 the seat can be maintained in the desired attitude so that the seat will not oscillate due to vehicle vibrations or as the vehicle may move over irregular or rough terrain as it travels along the slope.

The tilting mechanism of the invention does not require an auxiliary electrical or hydraulic power source and does not require any complex guiding mechanism for guiding the seat in tilting movement. The seat is supported solely by the seat support bracket 4, along with the linkage 5 and 6, and the pivotal connection of the piston rod 10 to the angle 3.

Various modes of carrying out the invention are contemplated as being within the scope of the following claims particularly pointing out and distinctly claiming the subject matter which is regarded as the invention.

I claim:

1. A tiltable seat assembly for a vehicle, comprising a frame, a seat, a vertically disposed cylinder fixed to said frame, a seat supporting linkage having one end connected to said cylinder, pivot means for pivotally connecting the opposite end of said linkage to said seat, said pivot means including a pivot axis extending in a fore and aft direction and disposed substantially midway between the sides of said seat, a piston slidable within said cylinder, a piston rod connected to said piston and extending outwardly of the upper end of said cylinder and pivotally connected to the seat adjacent a side edge of said seat, and conduit means interconnecting the end portions of said cylinder on opposite sides of said piston, tilting movement of the seat about said pivot axis caused by the weight of the operator acting to move said piston rod and thereby cause fluid from one end of said cylinder to pass through said conduit means to the opposite end of said cylinder.

2. The seat assembly of claim 1, wherein said linkage includes a first link fixed to said cylinder and a second link pivotally interconnecting to both said first link and said seat.

3. The seat assembly of claim 1, and including a second piston rod connected to said piston and extending from the lower end of said cylinder, said conduit means being disposed externally of said cylinder, and said assembly including valve means disposed in said conduit means for controlling the flow of fluid through said conduit means, said valve means being disposed laterally of said cylinder in position to be readily engaged by said operator.

* * * * *